(12) United States Patent
O'Neill

(10) Patent No.: US 6,871,068 B1
(45) Date of Patent: Mar. 22, 2005

(54) DATABASE UPDATED IN A MOBILE COMMUNICATION SYSTEM

(75) Inventor: Dominic Desmond Phelim O'Neill, Bristol (GB)

(73) Assignee: Orange Personal Communications Services, Bristol (GB)

( * ) Notice: Subject to any disclaimer, the term of this patent is extended or adjusted under 35 U.S.C. 154(b) by 0 days.

(21) Appl. No.: 09/582,721

(22) PCT Filed: Dec. 22, 1998

(86) PCT No.: PCT/GB98/03881

§ 371 (c)(1),
(2), (4) Date: Jun. 29, 2000

(87) PCT Pub. No.: WO99/35867

PCT Pub. Date: Jul. 15, 1999

(30) Foreign Application Priority Data

Dec. 30, 1997 (GB) .............................. 9727463

(51) Int. Cl.$^7$ ................................................ H04Q 7/20
(52) U.S. Cl. ................. 455/433; 455/426.1; 455/432.3; 707/10; 707/202; 707/204; 379/221.03; 379/221.04
(58) Field of Search ................................ 435/433, 426, 435/568, 8, 9; 707/10, 202, 204; 379/221.04, 133, 112.04, 112.05

(56) References Cited

U.S. PATENT DOCUMENTS

| | | | | |
|---|---|---|---|---|
| 5,561,854 A | * | 10/1996 | Antic et al. ................. | 455/56.1 |
| 5,799,323 A | * | 8/1998 | Mosher, Jr. et al. ........ | 707/202 |
| 5,890,156 A | * | 3/1999 | Rekieta et al. ................. | 707/10 |
| 5,946,689 A | * | 8/1999 | Yanaka et al. ................. | 707/10 |
| 5,966,431 A | * | 10/1999 | Reiman et al. ............. | 379/115 |
| 6,169,794 B1 | * | 1/2001 | Oshimi et al. ......... | 379/221.09 |
| 6,188,695 B1 | * | 2/2001 | Przybysz .................... | 370/410 |
| 6,189,017 B1 | * | 2/2001 | Ronstrom et al. .......... | 707/204 |
| 6,199,069 B1 | * | 3/2001 | Dettinger et al. ........... | 707/202 |
| 6,230,164 B1 | * | 5/2001 | Rekieta et al. .............. | 707/201 |

* cited by examiner

*Primary Examiner*—William Trost
*Assistant Examiner*—Danh Le
(74) *Attorney, Agent, or Firm*—Townsend and Townsend and Crew LLP

(57) ABSTRACT

In a telecommunications system a data function and a date control function are replicated in a plurality of databases (50, 51, 52, 53, 54). In order to synchronize updating of the databases (50, 51, 52, 53, 54), one database is identified as a primary database (50), at least one is identified as a primary standby database (51), and the others identified as secondary databases (52, 53, 54). Then, in normal operation, the data control function of the primary database (50) is arranged to generate signals for synchronized updating of the other databases. In the event of a failure of the primary database, the or a standby primary database (51) takes over the up-grading operating. Tee present invention is particularly, but not exclusively, directed to a telecommunications system for mobile telephones.

10 Claims, 2 Drawing Sheets

DATABASE UPDATED IN A MOBILE COMMUNICATION SYSTEM

BACKGROUND OF THE INVENTION

Field of the Invention

The present invention relates to a telecommunication system. The present invention is particularly, but not exclusively, concerned with a telecommunications system for mobile telephones.

SUMMARY OF THE PRIOR ART

When a telecommunication system involves mobile telephones, a call to a mobile telephone is not to a fixed point, and therefore the system must determine the location of the destination. The simplest arrangement is for a call to a mobile telephone to result in a signal being transmitted to a data storage unit in the form of a Home Location Register unit (HLR) which determines the location of the mobile telephone, and so permits routing of the call to occur.

Inevitably, HLRs have a limited capacity, and some arrangement is therefore necessary to enable telecommunication systems to access multiple HLRs. It should be noted that it is also envisaged that users may need multiple MSISDN numbers, for example if a user is to have the possibility of both voice and data communication, in existing systems, any second MSISDN number with a common identity number (IMSI) must be a MSISDN number of the same HLR as the previous MSISDN number. This could be impossible to achieve if, for example, the HLR containing the original information is full. Then the only way that additional services could be provided would require the user to change telephone number, which would be undesirable. This becomes a particular problem if it is desirable that users are able to select their numbers, rather than be provided with them.

WO 96/11557 (corresponding to U.S. Ser. No. 08/809,767) the disclosure of which is herein incorporated by reference, proposed that the switch network which connects users to other users, HLRs, and system services, had a register unit associated therewith, which register unit contained information relating each telephone number to a corresponding one of a plurality of HLRs. The relationship between telephone numbers and HLRs should then be freely selectable within the register unit, so that the register unit acted as a converter between the number and the information identifying the HLR.

By providing such a register unit, the fixed relationship between numbers and HLRs was broken, and any number can be assigned to any HLR, assuming space permits. WO 96/11557 also proposed that the register unit stored further information associated with the mobile telephones which permits the switch network to enable calls from mobile telephones to be routed to different services, depending on the calling mobile telephone itself, in addition to the number dialled.

SUMMARY OF THE INVENTION

The present invention develops further the ideas proposed in WO 96/11557 by considering the location within which information is stored in the network. In WO 96/11557, the question of the location of the register unit was not considered.

When considering data in the network, there are two things that need to be taken into account. The first is the storage of the data itself, and the second is data control, being the means of handling queries, updates, results in synchronisation messages and similar controls. The arrangement described in WO 96/11557 can be considered to be of this type in that the register needs to store data, and also needs to store control information for acting on that data.

At first sight, both the data and the data control functions may be located at a single site, and stored on a single physical device such as a server which responds to queries and updates. The information stored may be considered to comprise a data function and a data control function, with the data function representing sets of data relating to respective telephone numbers, telephone control operations, etc. The data function and data control function may be considered to form a database of functions.

However, if there is only a single database that operate in this way, the network is vulnerable to failure. Therefore, at its most general, the present invention proposes that the database of functions be replicated a plurality of times. Each database comprises a data function and a data control function. The replicated databases may physically be located in a single location, or may be at a plurality of physically separate locations. In either case, each replicated database may be considered to be a service data function with each such function being a notional site in the network. The sites of the functions are thus virtual sites, rather than being necessarily physically separate.

Preferably, each service data function may be stored on a separate storage device. That storage device may also store other information needed by the network, or may control only the service data function. However, from an operational point of view, the relationships between the service data functions are more important than their physical locations. Although the service data functions represent a distributed database, that distributed database must form a logically singular entity, even when physically distributed. Otherwise, the network will not operate correctly. Therefore, control must be applied across the distributed database.

For example, when considering such a distributed set of functions, it is important for the data functions to be synchronised and the data control functions to interwork to control the synchronisation. This synchronisation includes not only the need for the information about any particular telephone number to be the same at each function, but also for the facilities associated with that telephone number to the same at each function. The present invention therefore relates to the synchronisation of those functions.

It should be noted that although the present invention has been developed in connection with the register unit of WO 96/11557, the present invention is not limited to the operation of that register unit, and relates to arrangements in any network in which functions are distributed. Where the present invention is used in connection with the register unit of WO 96/11557, the register unit may be embodied in any of the distributed service data functions, or the actions of the register unit may be distributed across more than one service data function.

In a telephone network, it is important that any updating of the functions is carried out in real-time, and in a synchronised way. It is not acceptable for the network to be updated gradually, as happens in existing computer database techniques.

The present invention therefore proposes that, in a network of interconnected functions each of which is to be synchronised, one of those functions is identified as a primary function, at least one other function is identified as a primary standby function, with any remaining function(s) being considered secondary. Then, when updating is needed, the primary function synchronises all other functions by signalling to them an update that it has received. Those other functions then signal to the primary function that they have acted on the update. The primary function may then signal externally that the update has occurred, and at the same time provide acknowledgement signals to the other functions.

In principle, only the primary function can do this. However, if for any reason the primary function fails, the primary standby function takes over control of the updating operation.

There may be multiple primary standby functions, although in a mobile telephone system other constraints may limit arrangements to a single primary standby function. All other functions are secondary, in the sense that they are incapable of taking over control of the updating operation without re-programming of the network.

In such a system, requests for updating are sent only to the primary function, unless that has failed, in which case all update requests are sent to the primary standby function.

In such an arrangement, it is possible for a secondary function to fail to carry out an update correctly. In such circumstances, the primary function is aware of this because it does not receive an appropriate acknowledgement, and tone secondary function is then treated as unsynchronised. In the unsynchronised state, the primary function will not attempt to update the secondary function. There may, however, be arrangements to permit an unsynchronised secondary function to resume a synchronised state, by causing the primary function to transmit to that secondary function all updates which have occurred since the secondary function became unsynchronised. Therefore, it is preferable that the primary, the primary standby, and/or the secondary function is arranged to record when any secondary function becomes unsynchronised.

BRIEF DESCRIPTION OF THE DRAWINGS

An embodiment of the present invention will now be described in detail, by way of example, with reference to the accompanying drawings, in which.

DETAILED DESCRIPTION

Figure 1:
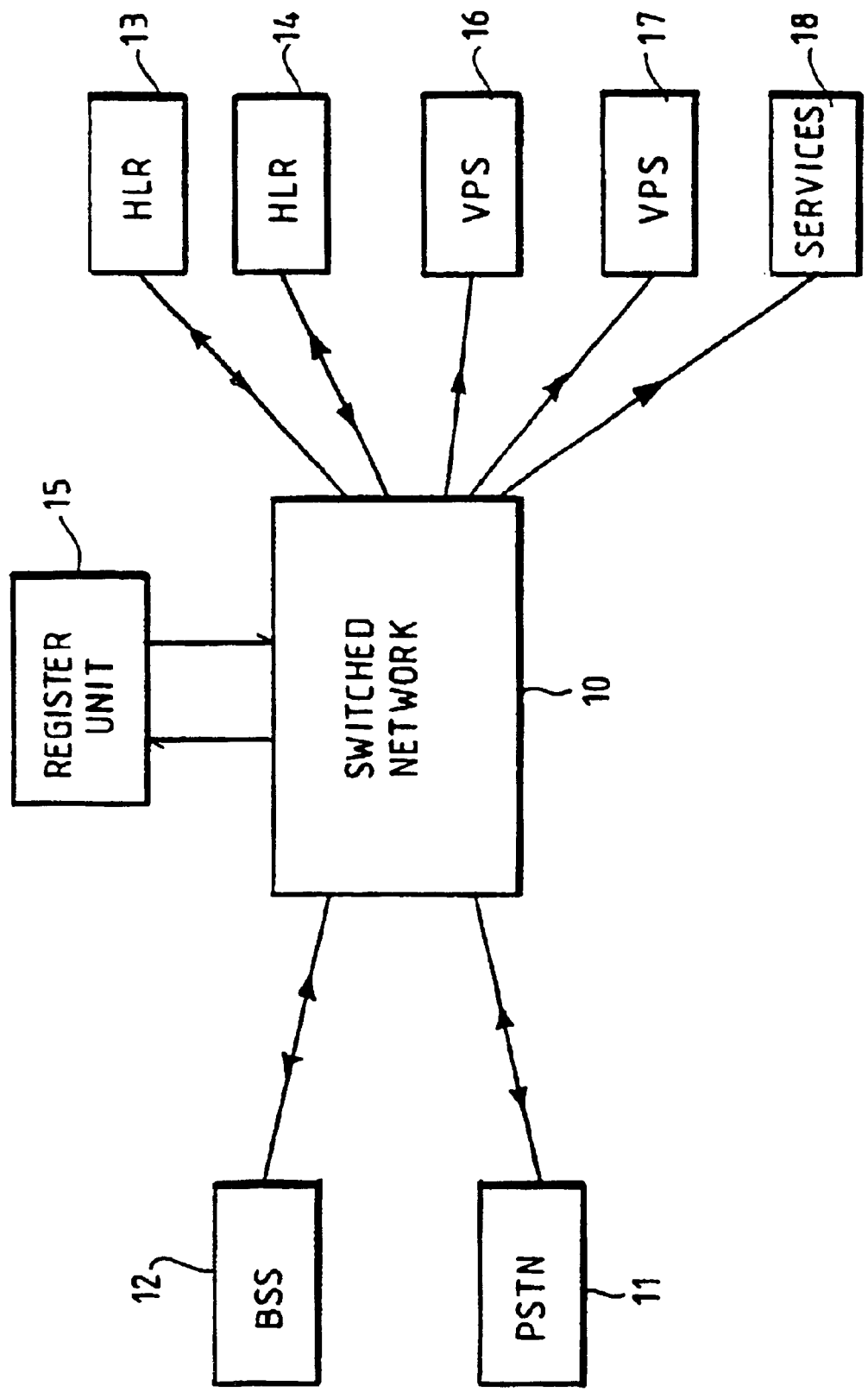
FIG. 1 is a schematic block diagram of a telecommunication system described in WO 96/11557.

Referring first to FIG. 1, and as discussed in WO 96/11557, a switched network 10 interconnects land-based and mobile telephones. If a call to a mobile telephone is made from a land-based telephone, the call is routed via the public switched telephone network (PSTN) 11 to the switch network, and from that switch network 10 to the mobile telephone (BSS) 12. To do this, the switch network 10 must determine routing information, and to determine that routing information it must determine the location of the mobile telephone 12, which it does via a HLR to which the mobile telephone 12 is associated. When there are multiple HLRs 13,14, it is necessary for the switch network 10 to determine which HLR 13,14 must be accessed, on the basis of the telephone number (MSISDN number) of the mobile telephone input by the originator of the call.

The switched network 10 accesses a register unit 15, which identifies the called number and addresses it to a particular HLR 13,14 with which the mobile telephone 12 is associated. The register unit 15 permits the relationship between any given mobile telephone number and the HLRs 13,14 to be determined freely, so that the number is unaffected by the particular HLR 13,14 with which it is associated. The register unit 15 removes the need for a particular mobile telephone number to be associated with a fixed HLR 13,14.

Once the particular HLR 13,14 with which the mobile telephone 12 is associated has been identified, signalling can occur to that HLR, and information derivable therefrom, in the usual way. This information is used to "set-up" the call to the mobile telephone 12, which may then be routed to the destination telephone as is normal.

Similarly, if a call originates at the mobile telephone 12, the switch network 10 must again determine the routing of that call. If the call is to a land-based telephone, connected to the switch network 10 via the PSTN 11, then this routing can be on the basis of the telephone number of the destination telephone, in the normal way.

If a call is made from a mobile telephone 12 to one of a plurality of voice processing systems 16,17 or to services 18 associated with the switch network using a short code (e.g. 123) the relationship between the mobile telephone 12 and the corresponding service must be determined by the register unit 15 before the switch network can determine the appropriate voice processing system 16,17 or services 18 to be accessed.

Figure 2:
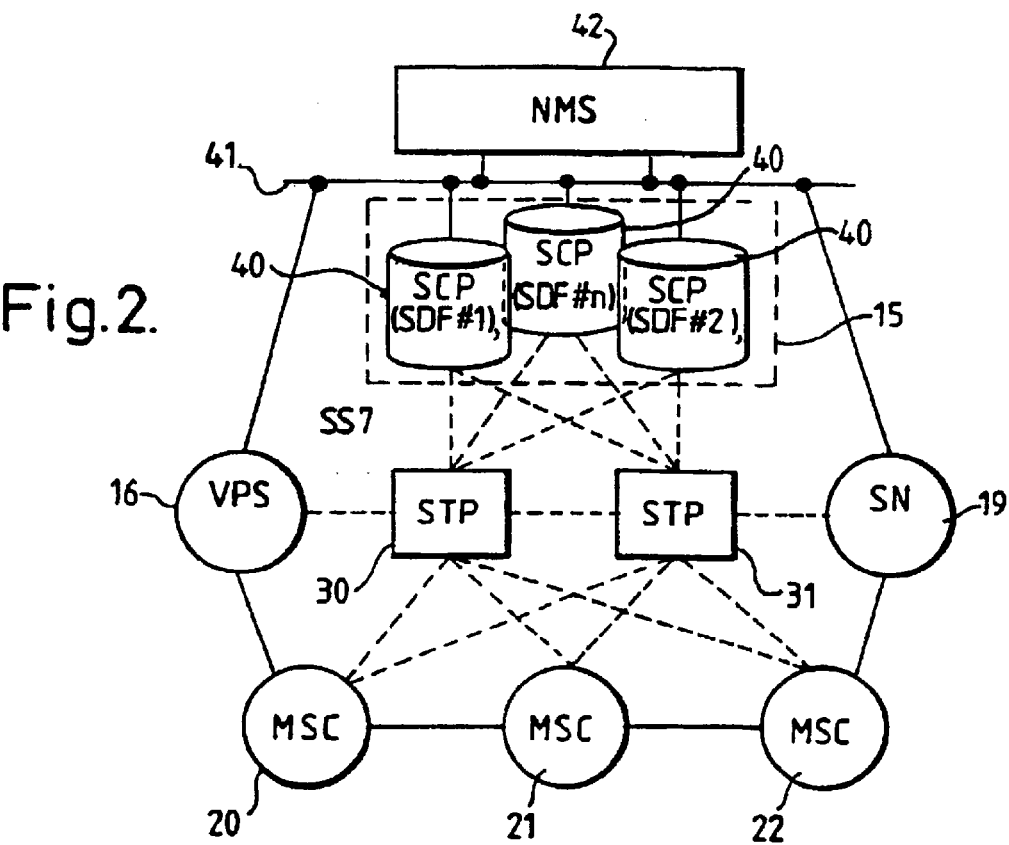
FIG. 2 shows part of the telecommunication system of the present invention.

FIG. 2 shows the switch network 10 in more detail. It has a plurality of mobile switching centres (MSC) 20,21 and 22, and a call destined to any given mobile telephone results in signalling between that MSC 20–22 and one of a plurality of signalling transfer points (STP) 30,31, which signal to the register unit 15 to determine the HLR 13,14 which is appropriate to the mobile telephone 12. The register unit 15 of FIG. 1 derives that information from the telephone number (MSISDN number) of the mobile telephone 12. It would then be possible for the register unit 15 to forward the signal directly to the appropriate HLR 13,14 but, it is preferable that the information is passed back to the corresponding STP 30,31 which then passes the signalling to the correct HLR 13,14.

A similar signalling flow occurs when the user of the mobile telephone 12 tries to access a voice processing system (VPS) 16 or a service node (SN) 17. The call is received by one of the MSCs 20,21 and 22 which passes the dialled digits and the identity of the mobile telephone to one of the STPs 30,31,32. This relays the information to the register unit 15, which uses this information to construct the correct address of the appropriate voice processing service (VPS) 16 or service node (SN) 17. That information is relayed back from the register unit via one of the STPs 30,31,32 to the original MSC 20,21,22. This address is then used to route the call by the switch network 10. That routing passes the call from the appropriate MSC 20,21,22 via the switch network to the VPS 16 or the SN 17.

In the arrangement shown in FIG. 2, the register unit 15 is not a single component, but comprises a plurality of units hereinafter referred to as service control points (SCP) 40. There are N SCP 40, wherein N is an integer being 2 or greater. At least two SCP 40 are needed in order to provide a replicated database for load sharing and fault tolerance.

In the arrangement of FIG. 2, the SCPs 40 are interconnected by a data connection 41, and the system also has a controller (NMS) 42 that monitors the service control points (SCP) 40.

Figure 3:
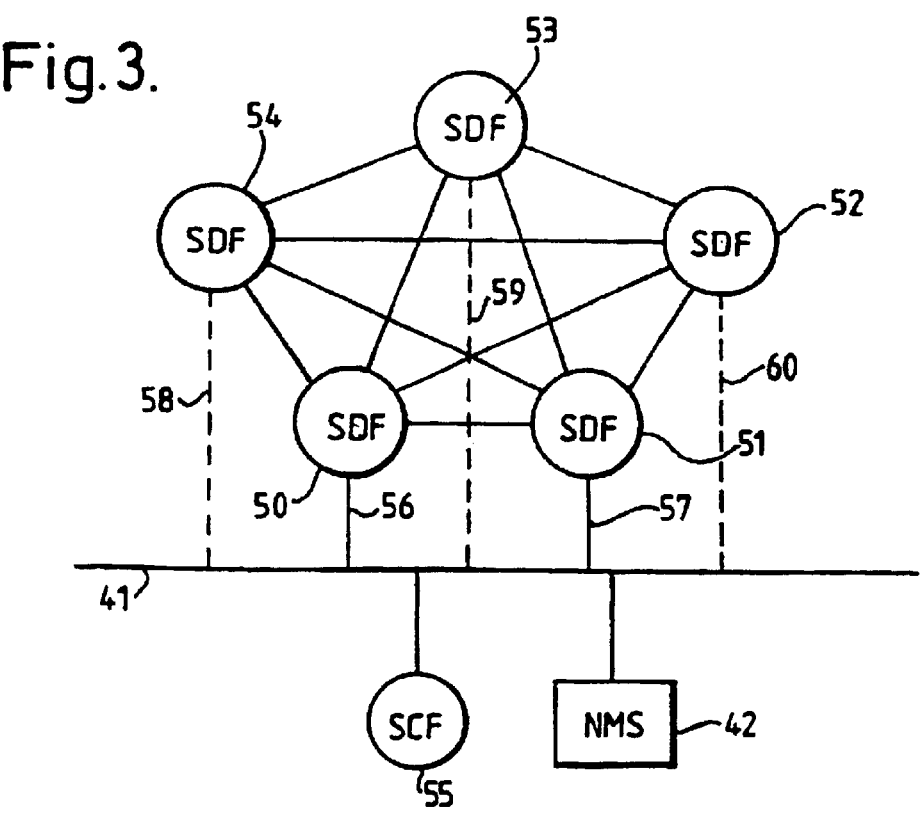
FIG. 3 shows part of the arrangement of FIG. 2, in terms of significant functional components.

FIG. 2 illustrates the arrangement of the network in structural terms. However, it is also possible to think of the arrangement in functional terms, and the significant functions of the arrangement of FIG. 2 are illustrated in FIG. 3. The SCPs 40 may, collectively, be considered as a plurality of functions, primarily data functions, which collectively provide a centralised repository for service/subscriber related data. Each of these functions will be referred to as a service data function or SDF. Thus, as shown in FIG. 3, a plurality of such functions (SDFs) 50,51,52,53 and 54 are interconnected, and connected to the data connection 41. FIG. 3 also shows a service control function SCF 55 which is a logical element (in the same way as the SDFs 50–54 are logical elements) corresponding to VPS 16, service node 19 etc. in FIG. 2. The SCF 55 can be thought of as a "client" within the network which requests data from, updates to, etc the SDFs 50–54.

One of the SDFs 50 is designated a primary function, and has primary responsibility for synchronising updating of the other SDFs 51–54. The link between the SCF 55 and the data connection 41 is a path for data being retrieved by an SCF 55, and also of update information to the SDF 50.

At least one other SDF 51 is designated a primary standby function and has a similar link 57 to the connection 41. As will be discussed in more detail later, the primary standby function 51 operates to take over the control of updating carried out by the primary function 50 if the primary function 50 is unable to carry out that operation correctly. Whilst there may be more than one primary standby function, in the arrangement shown in FIG. 3, all the other SDFs 52,53,54 are secondary functions. Those secondary functions 52,53,54 are also connected by suitable connection 58, 59, 60 to the data connection 41. Those connections 58, 59, 60 are involved in retrieval of data for an SCF, synchronisation of updates from the primary function SDFs, but not directly in updating from an SCF. Instead, all the SDFs 50–54 are interconnected for updating controlled by the primary function 50, or the primary standby function 51. In fact, those interconnecting are normally via connections 56 to 60 and data connection 41, but for functional purposes may be considered to be direct as shown in FIG. 3.

In normal use, functions (SDFs) 50–54 provide a composite memory in which, in a mobile telephone system, information about users, network functions, etc may be stored as discussed in more detail in WO 96/11557.

The present invention, however, is particularly concerned with the updating of the function network thus created.

In normal operation, a request for updating of data stored in the SDFs 50–54 is received at the primary function 50. When update information is received by the primary function 50, the primary function 50 signals the update to all other functions 51–54. When those functions 51–54 have recorded the update, they signal back to the primary function 50 that the update has been completed. Thus, the primary function 50 can store information confirming that all the other functions 51–54 have been successfully updated. The primary function 50 may then signal to the SCF 55 to confirm that the update operation has been completed, and also confirm to the other functions 51–54 that it has recorded the completion of the update and that the SCF has been notified. Thus, at all times, the functions 50–54 are synchronised.

If any secondary function 50–54 fails successfully to record an update, this will be detected by the primary function 50 and that secondary function will then be considered unsynchronised, and thus not a reliable source for data. The primary function 50 will not attempt to send further update signals to such an unsynchronised secondary function. Of course, if there are too many failures, the primary function may determine that the attempted update of the network of functions has wholly failed, in which case a suitable signal will be sent to the SCF 55, and the update operation rejected.

It is preferable that an unsynchronised secondary function can subsequently return itself to the synchronised state. An unsynchronised secondary function may signal to the primary function 50 an indication of the last update which it successfully completed. The primary function 50 may then determine all subsequent updates and transmit all those updates to the unsynchronised secondary function. If the unsynchronised secondary function successfully records all those updates, it may be considered to have returned to synchronisation. Once synchronised, the primary function 50 will continue to update that secondary function in the normal way.

Under some circumstances, the primary function 50 may need to be closed down. For example, this may be because the hardware on which the primary function 50 is resident needs to be maintained. To prevent the network of functions having to be closed down at this time, the actions of the primary function 50 are transferred to the primary standby function 51. This hand-over of operations is signalled between the primary function 50 and the primary standby function 51, and also with the SCF 55. Any existing updates should be completed before this hand-over occurs, so that all SDFs are synchronised prior to the primary standby function 51 taking over.

This procedure can also apply in an unexpected failure of the primary function 50. As has previously been mentioned, when the primary function 50 has received confirmation from all the other functions 51–54 that updating had occurred, it notifies the requesting SCF and then signals an acknowledgement to those other functions. If that acknowledgement is not received by the primary standby function 51 within a predetermined time and the primary standby function 51 is informed by the switched network 10 that the primary function is unavailable, the system may be arranged so that the primary standby function 51 then automatically takes over control of the network functions 50–54 under the assumption that the primary function is no longer available.

Simultaneous failure of one or more secondary functions does not prevent the network of functions operating successfully, and either the primary function 50 or the primary standby function 51 may fail, in combination with any of the secondary functions 52–54 and data updating and querying will still be possible. However, if both the primary function 50 and the primary standby function 51 fail at the same time, then the remaining network of functions will only be able to support data retrievals; data updating will not longer be possible. For this reason, it may be preferable to provide multiple primary standby functions, although other constraints within mobile telephone networks may prevent this.

It should be noted that although FIG. 3 illustrates an embodiment with five functions (SDFs) 50–54, the minimum number of functions to achieve the present invention is two. In such an arrangement, one function acts as a primary function, and the other acts as a primary stand-by function. Further secondary functions then increase redundancy and load sharing.

In the above description, each service control point (SCP) 40 was associated with a corresponding SDF 50 to 54. It should be noted that any single SCP 40 may act as the storage site for only the corresponding SDF 50–54, or may store other information, such as data or control operations.

Moreover, in the preceding description, the present invention has been described in terms of a way of implementing the arrangements discussed in WO 96/11557. However, the present invention is not limited to this. The operations carried out by the SDF 50–54 may be any data and/or data control functions. The operations described with reference to WO 96/11557 then act as examples of such functions.

What is claimed is:

1. A telecommunication network having at least one database of functions for controlling the network, said database comprising at least a data function and a data control function;

characterised in that:

the database is replicated a plurality of times, the database of one of said replicated databases is a primary database, the data control function of which is arranged to generate signals for synchronised updating of all of said replicated databases, at least a second database is a primary standby database, the data control function of which is arranged to generate signals for synchronised updating of all of said replicated databases in the event of a failure of said primary database, and at least one secondary database other than said primary database and said primary standby database, wherein the at least secondary database is arranged to signal to said primary and/or said primary standby database when it has been updated in response to the updating signals from said primary database or said primary standby database.

2. A network according to claim 1, wherein a plurality of databases are primary standby databases.

3. A network according to claim 1, wherein the at least one secondary database is a plurality of secondary databases.

4. A method of operating a telecommunication network, in which the network is controlled by at least one database of functions, said database comprising at least a data function and a data control function;

characterised in that:

the database is replicated a plurality of times, and the method comprises:

designating one of said replicated databases as a primary database;

designating at least one other of said replicated databases as a primary standby database;

designating at least one other of said replicated databases as a secondary database;

updating all of said replicated databases on the basis of updating signals from said primary database unless said primary database has failed;

updating all of said replicated databases on the basis of updating signals from said at least one primary standby database when said primary database has failed; and signaling to the primary and/or the primary standby database(s) when the at least one secondary database has been updated in response to the updating signals from the primary database or the primary standby database.

5. A method of operating a telecommunication network according to claim 4, wherein the at least one secondary database is a plurality of secondary databases.

6. A telecommunications network comprising:

a primary database having at least a data function and a data control function; and a plurality of databases which are replicas of the primary database, wherein at least one of the plurality of databases in a primary standby database, and wherein at least one other of the plurality of databases is a secondary database;

wherein the data control function of the primary database is arranged to generate signals for synchronised updating the plurality of databases, and wherein the data control function of the primary standby database is arranged to generate signals for synchronised updating of the plurality of databases in the even of a failure of the primary database; and wherein the at least one secondary database is arranged to signal to the primary or the primary standby database when it has been updated in response to the updating signals from the primary database.

7. A network according to claim 6, further comprising a plurality of primary standby databases.

8. A telecommunications network according to claim 6, wherein the at least one secondary database is a plurality of secondary databases.

9. A method of operating a telecommunication network, comprising:

providing an initial database having at least a data function and a data control function;

replicating the initial database to form plurality of replicated databases;

designating one of the replicated databases as a primary database;

designating at least one other of the replicated databases as a primary standby database;

designating at least one other of said replicated databases as a secondary database;

updating all of the replicated database on the basis of updating signals received from the primary database unless the primary database has failed;

updating all of the replicated databases on the basis of updating signals from the at least one primary standby database when the primary database has failed; and signaling to the primary and/or the primary standby database(s) when the at least one secondary database has been updated in response to the updating signals from the primary database or the primary standby database.

10. A method of operating a telecommunication network according to claim 9, wherein the at least one secondary database is a plurality of secondary databases.

* * * * *

UNITED STATES PATENT AND TRADEMARK OFFICE
CERTIFICATE OF CORRECTION

PATENT NO. : 6,871,068 B1
APPLICATION NO. : 09/582821
DATED : March 22, 2005
INVENTOR(S) : O'Neill It is certified that error appears in the above-identified patent and that said Letters Patent is hereby corrected as shown below:

Title page, title item (54), delete "Updated" and insert --Updating--

Title page, Below item (86) § 371 (c)(1), (2), (4) date (86), delete "Jun. 29, 2000" and insert --Jun. 28, 2000--

Title page, Abstract item (57), line 1, delete "date" and insert --data--

Title page, Abstract item (57), line 12, delete "Tee" and insert --The--

Column 3, line 26, delete "tone" and insert --the--

Signed and Sealed this

Fifteenth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,871,068 B1
APPLICATION NO. : 09/582721
DATED : March 22, 2005
INVENTOR(S) : O'Neill Page 1 of 1

It is certified that error appears in the above-identified patent and that said Letters Patent is hereby corrected as shown below:

Title page, title item (54), delete "Updated" and insert --Updating--

Title page, Below item (86) § 371 (c)(1), (2), (4) date (86), delete "Jun. 29, 2000" and insert --Jun. 28, 2000--

Title page, Abstract item (57), line 1, delete "date" and insert --data--

Title page, Abstract item (57), line 12, delete "Tee" and insert --The--

Column 3, line 26, delete "tone" and insert --the--

This certificate supersedes Certificate of Correction issued August 15, 2006.

Signed and Sealed this

Nineteenth Day of September, 2006

JON W. DUDAS
*Director of the United States Patent and Trademark Office*